(12) United States Patent
Clark

(10) Patent No.: US 6,895,509 B1
(45) Date of Patent: May 17, 2005

(54) TAMPER DETECTION SYSTEM FOR SECURING DATA

(75) Inventor: Douglas A. Clark, Wallingford, CT (US)

(73) Assignee: Pitney Bowes Inc., Stamford, CT (US)

( * ) Notice: Subject to any disclaimer, the term of this patent is extended or adjusted under 35 U.S.C. 154(b) by 913 days.

(21) Appl. No.: 09/667,845

(22) Filed: Sep. 21, 2000

(51) Int. Cl.⁷ .......................... H04L 9/00; H04L 9/32; H04L 17/02; H01L 23/58; G06F 11/30; G06F 12/14

(52) U.S. Cl. .................. 713/200; 713/194; 380/52; 257/922

(58) Field of Search ................ 713/200, 194; 380/52; 257/922

(56) References Cited

U.S. PATENT DOCUMENTS

| | | | |
|---|---|---|---|
| 4,516,679 A | 5/1985 | Simpson et al. | |
| 4,593,384 A | 6/1986 | Klejine | 365/228 |
| 4,691,350 A | 9/1987 | Klejine et al. | 380/3 |
| 4,807,284 A | 2/1989 | Kleijne | 380/3 |
| 4,811,288 A | 3/1989 | Kleijne et al. | 365/52 |
| 4,860,351 A | 8/1989 | Weingart | 380/3 |
| 5,117,457 A | 5/1992 | Comerford et al. | 380/3 |
| 5,389,738 A * | 2/1995 | Piosenka et al. | 174/52.4 |
| 5,406,630 A | 4/1995 | Piosenka et al. | 380/52 |
| 5,675,319 A | 10/1997 | Rivenberg et al. | 340/550 |
| 5,858,500 A | 1/1999 | MacPherson | 428/68 |
| 5,880,523 A | 3/1999 | Candelore | 257/679 |
| 5,988,510 A | 11/1999 | Tuttle et al. | 235/492 |
| 6,424,954 B1 | 7/2002 | Leon | |
| 6,469,625 B1 | 10/2002 | Tomooka | |

FOREIGN PATENT DOCUMENTS

| | | | |
|---|---|---|---|
| DE | 19816571 A1 | 10/1999 | G07C/9/00 |
| DE | 19816572 A1 | 10/1999 | G06K/19/00 |
| EP | 0629497 A2 | 12/1994 | |
| EP | 1184773 A1 | 3/2002 | |
| EP | 1207444 A2 | 5/2002 | |
| GB | 2174830 A | 11/1986 | |
| GB | 2297540 A | 8/1996 | |
| GB | 2298391 A | 9/1996 | |
| GB | 2330439 A | 4/1999 | |
| US | 2001/0056542 A1 | 12/2001 | |
| US | 2002/0002683 A1 | 1/2002 | |
| WO | 99/21142 | 4/1999 | |
| WO | 01/63994 A2 | 8/2001 | |

OTHER PUBLICATIONS

Fips Pub 140–2 Federal Information Processing Standards Publication—Security Requirements for Cryptographic Modules, Issued May 25, 2001.

* cited by examiner

*Primary Examiner*—Gilberto Barron
*Assistant Examiner*—Benjamin E. Lanier
(74) *Attorney, Agent, or Firm*—Brian A. Lemm; Angelo N. Chaclas

(57) ABSTRACT

A tamper detection system includes a trigger mechanism system and a detection circuit that operate in combination to protect an integrated circuit from attack. The detection circuit connects to the trigger mechanism system that is basically a protective mesh that consists of two separate loops of wire held in close proximity to each other and an optional ground layer. The mesh is such that an attempted penetration is highly likely to cause an open of either loop or a short of one loop to the other. The detection system recognizes shorts and opens in the mesh. The detection circuit is intended to be very simple in its operation it that it does not require a sophisticated stimulus and response set to operate. It is designed to be polled on a regular basis for indications of a change in its operation.

20 Claims, 1 Drawing Sheet

TAMPER DETECTION SYSTEM FOR SECURING DATA

FIELD OF THE INVENTION

This invention relates generally to data protection systems. More particularly, in the preferred embodiments, this invention is directed to a tamper detection system for detecting unauthorized attempts to access an integrated circuit.

BACKGROUND OF THE INVENTION

In many different industries, there is a need to protect data (information) from discovery. Oftentimes, the data is resident within the discrete electronic components of an integrated circuit. In turn, the integrated circuit may be incorporated into a printed circuit board, a smart card or other electronic device. The data itself may be of a wide variety depending upon the particular industry. As examples, the data may be used in: monetary transactions (debit card, postage metering, etc.) and controlled access systems (security badges). Furthermore, the data may be cryptographic keys, account balances, some combination of these or any other type of data that is to be protected.

Because of the risks of fraud and security breaches, there is a great deal of industry attention dedicated to securing the data from tampering and/or preventing access to the discrete components of the integrated circuit. Generally, such measures are directed to both physical security (epoxy enclosures, sealed devices) and electronic security, such as: encryption, data protection devices and the like. Although these techniques generally work well, they can be costly to develop, reduce to practice and implement into production.

Therefore, there is a need for a cost effective and efficient system for detecting unauthorized attempts to access an integrated circuit so as to prevent the data contained within or operation of the integrated circuit from being tampered with.

SUMMARY OF THE INVENTION

In the most preferred embodiments, the present invention provides a tamper detection system that includes a trigger mechanism system and a detection circuit that operate in combination to protect an integrated circuit from attack. The detection circuit connects to the trigger mechanism system that is basically a protective mesh that consists of two separate loops of wire held in close proximity to each other and an optional ground layer. The mesh is such that any attempted penetration is highly likely to cause an open of either loop or a short of one loop to the other. The detection system recognizes shorts and opens in the mesh. The detection circuit is intended to be very simple in its operation in that it does not require a sophisticated stimulus and response set to operate. It is designed to be polled on a regular basis for indications of a change in its operation.

In accordance with the present invention, there is provided a tamper detection system for securing a protected integrated circuit from attack. The tamper detection system includes a power source, a trigger circuit and a detection circuit. The trigger circuit includes a plurality of resistors and a plurality of wire loops where the plurality of resistors include a first resistor, a second resistor and a third resistor, all of which being wired together in series and operatively connected to the power source. The plurality of wire loops include a first wire loop extending between the first resistor and the second resistor and a second wire loop extending between the second resistor and the third resistor. The first wire loop and the second wire loop are electrically isolated from each other but in overlapping physical proximity to each other so as to form a protective mesh that envelopes the protected integrated circuit. The detection circuit is in operative communication with the trigger circuit and the protected integrated circuit. The detection circuit monitors an uninterrupted flow of current through the trigger circuit (normal condition), such that an interruption or change in the current flow in the trigger circuit (attack attempt) due to an open condition in the first wire loop or the second wire loop or a short between the first wire loop and the second wire loop causes the detection circuit to output a predetermined signal.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
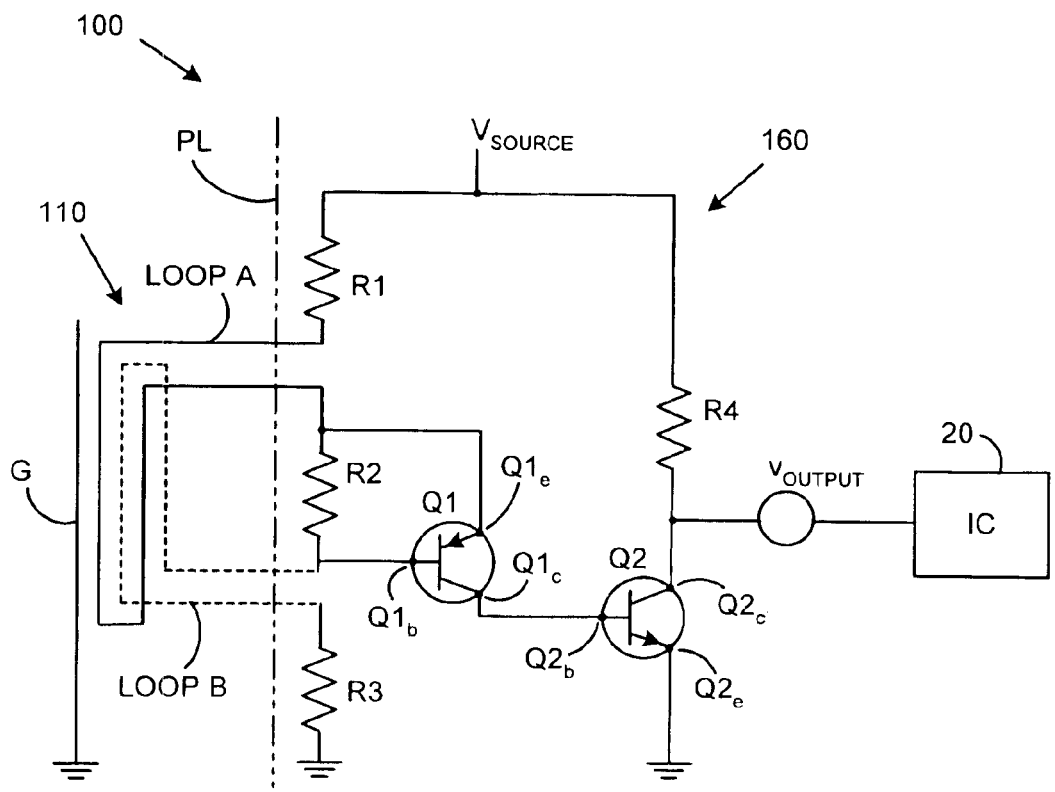
FIG. 1 is a simplified diagrammatic representation of a tamper detection system in accordance with the present invention.

Referring to FIG. 1, a tamper detection system 100 in combination with a protected integrated circuit 20 that it protects is shown. The tamper detection system 100 includes a trigger circuit 110 and a detection circuit 160. Generally, the trigger circuit 110 is shown to the left of the phantom line PL while the detection circuit 160 is shown to the right. It should be understood that the phantom line PL does not constitute part of the present invention, but is merely used to illustrate the geometric relationship between the trigger circuit 110 and the detection circuit 160. Those skilled in the art will recognize that the distinction between the elements that have been designated are part of the trigger circuit 110 and the detection circuit 160, respectively, is subject to interpretation. However, as a general rule, the elements that an intruder would initially come into contact with during a tamper attempt have been designated as the trigger circuit 110 while the remaining portions have been designated as the detection circuit 160.

Generally, the trigger circuit 110 and the detection circuit 160 operate as follows. The trigger circuit 110 is basically a protective mesh that envelopes/encloses the integrated circuit 20 that is to be protected. For the sake of clarity, in FIG. 1, the protected integrated circuit 20 has been shown separate from the trigger circuit 110. However, from the discussion below, those skilled in the art will appreciate that the trigger circuit 20 is intended to fully envelope the integrated circuit 20. The detection circuit 160 operates as a switch that detects breaches (shorts, opens, or ground shorts) in the trigger circuit 110 and provides an appropriate signal to the integrated circuit 20. This allows the integrated circuit 20 to initiate an appropriate response (i.e., zeroization of data, such as: cryptographic keys; self destruction, etc.) before the intruder has gained access to the integrated circuit 20.

The trigger circuit 110 includes a first wire loop LOOP A (shown in solid line), a second wire loop LOOP B (shown in dotted line to distinguish from the first wire loop LOOP A for clarity) and a ground layer G, all of which may be integrated into a common substrate such as a flex strip that envelopes the integrated circuit 20. The first wire loop LOOP A and the second wire loop LOOP B are not in electrical contact with each other or the ground layer G. However, to form the protective mesh, they are in physical proximity (overlapping, adjacent, interleaved, etc.) to each other. This may be achieved by integrating the first wire loop LOOP A and the second wire loop LOOP B into any number of different geometric patterns. Any pattern that is likely to cause the first wire loop LOOP A and the second wire loop LOOP B to come into electrical contact with each other in response to a variety of invasive attack attempts (drilling, probing, etc.) may be employed. Similarly, the ground layer G may also be a wire loop integrated with the first wire loop LOOP A and the second wire loop LOOP B or, in the alternative, may be a separate membrane (shield, layer, etc.) of the common substrate.

The detection circuit 160 includes four resistors R1, R2, R3 and R4 and two transistors Q1 and Q2. The detection circuit 160 is supplied by a voltage source $V_{source}$ (such as a battery or other suitable supply of power) and yields an output voltage $V_{output}$ signal at a designated node of the detection circuit 160 between an end of the forth resistor R4 opposite to the voltage source $V_{source}$ and the second transistor Q2. Under normal operating conditions, three of the resistors are aligned in series. The first wire loop LOOP A is connected between a first resistor R1 and a second resistor R2 while the second wire loop LOOP B is connected between the second resistor R2 and a third resistor R3. Generally, the values of the resistors should be selected in accordance with an acceptable amount of current draw for the given application while achieving a robust level of noise tolerance for the draw for the given application. Preferably, the resistors in series R1, R2 and R3 should be of the same value and suitable large impedance so that the current draw is sufficiently low to conserve power. A first transistor Q1, of the PNP type, includes three terminals: an emitter $Q1_e$, a collector $Q1_c$ and a base $Q1_b$. The first transistor emitter $Q1_e$ and the first transistor base $Q1_b$ are connected on either side of the second resistor R2, respectively, to allow a bias voltage to develop drop across the second resistor R2 which in turn allows the first transistor Q1 to conduct current. A second transistor Q2, of the NPN type, also includes three terminals: an emitter $Q2_e$, a collector $Q2_c$ and a base $Q2_b$. The second transistor base $Q2_b$ is connected to the first transistor collector $Q2_c$ while the second transistor emitter $Q2_e$ is connected to ground. The fourth resistor R4 is in parallel with the series resistors R1, R2 and R3 and is connected between the voltage source $V_{source}$ and the second transistor collector $Q2_c$. The output voltage $V_{output}$ is developed at the junction of the fourth resistor R4 and the second transistor collector $Q2_c$.

Figure 2:
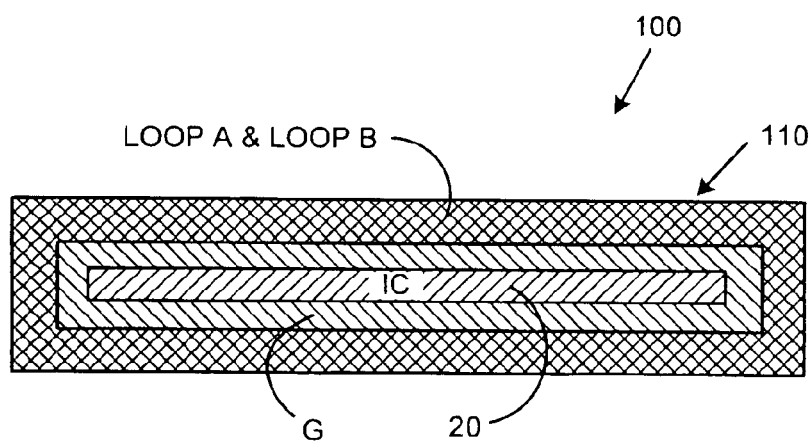
FIG. 2 is a cross section taken through the tamper detection system and an integrated circuit in accordance with the present invention.

Referring to FIG. 2 in view of FIG. 1, a cross section taken through the tamper detection system 100 and the protected circuit 20 is shown. Although FIG. 2 depicts the wire loops LOOP A and LOOP B external to the ground layer G, this has been represented this way for ease of illustration. In the most preferred embodiment, the integrated circuit 20 is surrounded by the interleaved mesh of the wire loops LOOP A and LOOP B and then encapsulated by the ground layer G. This arrangement adds an element of shielding to the entire assembly. Furthermore, the detection circuit 160 is incorporated into the protected circuit 20. Those skilled in the art will recognize that any suitable substrate (not shown), such as a flex strip, may be employed to carry the ground layer G and the wire loops LOOP A and LOOP B. Additionally, further protective coatings, such as epoxy based potting materials, may also be employed in combination with the elements discussed above.

Referring to FIGS. 1 and 2, the detection circuit 160 will assert its output when: (i) the wire loops LOOP A and LOOP B are shorted together; (ii) either of the wire loops LOOP A or LOOP B is broken; or (iii) either of the wire loops LOOP A or LOOP B is shorted to the ground layer G. It is anticipated that an attacker could not physically access the protected circuit 20 without causing one of these conditions to occur. Because the tamper detection system 100 does not: (i) send out a pulse and monitor the response, or (ii) rely on a processor; those skilled in the art will understand that the detection circuit 160 is passively operated.

During normal operation (no tampering), the wire loops LOOP A and LOOP B and the ground layer G all remain separate (electrically isolated) and intact. Thus, the three resistors R1, R2, and R3 are in series and drawing a nominal amount of current. The voltage drop created across the second resistor R2 allows bias current to flow through the first transistor Q1 from the first transistor emitter $Q1_e$ to the first transistor base $Q1_b$. This causes the first transistor Q1 to be switched on (biased into conduction) so that the first transistor collector Q1 supplies current to the second transistor base $Q2_b$. With the first transistor collector $Q1_c$ supplying current to the second transistor base $Q2_b$, the second transistor Q2 is turned on. This causes the second transistor collector $Q2_c$ to be held low. With the second transistor Q2 switched on, the output voltage $V_{output}$ is held low, or at roughly 0.2V. As discussed above, the forth resistor R4 should be sized to minimize the amount of current needed and still be robust and noise immune. In response to a low output voltage $V_{output}$, the protected circuit 20 assumes normal operation and takes no protective measures.

If the wire loops LOOP A and LOOP B were to be shorted together, then the output voltage $V_{output}$ goes high as the first transistor Q1 and the second transistor Q2 are turned off, allowing the output voltage $V_{output}$ to go high. Generally, this would result because of the following. The second resistor R2 would be shorted and the voltage across it would go to zero. This would not allow a bias voltage to develop from the first transistor emitter $Q1_e$ to the first transistor base $Q1_b$ to switch on the first transistor Q1. Thus, the first transistor is switched off (out of conduction—the first transistor collector $Q2_c$ goes low) and this in turn starves the second transistor Q2 of current and it too will be switched off. Here again, the second transistor Q2 is switched off because not of a lack of current flow from the second transistor base $Q2_b$ to the second transistor emitter $Q2_e$. With the second transistor Q2 switched off, the output voltage $V_{output}$ rises to equal the voltage source $V_{source}$ because their exists an "open" between the second transistor collector $Q2_c$ and the second transistor emitter $Q2_e$.

If the first wire loop LOOP A is broken, then the output voltage $V_{output}$ goes high by equaling the voltage source $V_{source}$. Generally, this would result because of the following. The connection (first wire loop LOOP A) from the first resistor R1 to the second resistor R2 is opened. As a result, the voltage drop across the second resistor R2 and the third resistor R3 goes to zero as the current flow producing the drop has been interrupted. As described above, this switches off the first transistor Q1, starves the second transistor Q2, turning it off too, and causes the output voltage $V_{output}$ to rise equal to the voltage source $V_{source}$.

Similarly, if the second wire loop LOOP B is broken, then the output voltage $V_{output}$ goes high by equaling the voltage source $V_{source}$. Generally, this would result because of the following. The connection from the second resistor R2 to the third resistor R3 is opened. As a result, the voltage drop across the first resistor R1, the second resistor R2 and the third resistor R3 goes to zero as the current flow producing the drop has been interrupted. As the voltage across the second resistor R2 goes to zero, with the removal of the current source to the first transistor Q1, the first transistor Q1 is switched off. Here again, this starves the second transistor Q2 of bias current and it switches off. However, the node between the first resistor R1 and the second resistor R2 floats up to $V_{source}$. But, since the first transistor Q1 is switched off, the second transistor Q2 is unable to receive bias current to remain switched on (in conduction). As a result, the output voltage $V_{output}$ rises equal to the voltage source $V_{source}$.

If the first wire loop LOOP A is shorted to the ground layer G, then the output voltage $V_{output}$ goes high by equaling the voltage source $V_{source}$. Generally, this would result because of the following. The first transistor emitter $Q1_e$ is brought to ground because the node between the first resistor R1 and the second resistor R2 is brought to ground. This prevents current from flowing through the first transistor Q1. Thus, the first transistor Q1 is switched off. This in turn switches off the second transistor Q2 and the output voltage $V_{output}$ rises equal to the voltage source $V_{source}$.

If the second wire loop LOOP B is shorted to the ground layer G, then the output voltage $V_{output}$ goes high by equaling the voltage source $V_{source}$. Generally, this would result because of the following. Although the the node between the second resistor R2 and the third resistor R3 is brought to ground, a voltage still exists across the second resistor R2. However, since the first transistor base $Q1_b$ and the first transistor collector $Q2_c$ are both low, at or near zero volts, the second transistor Q2 is not allowed to turn on. Those skilled in the art will recognize that care should be taken to ensure the voltage rise across the loop circuitry cannot rise to 0.7 volts or more to allow it to turn on. This can be accomplished with a low impedance flex circuit trace and/or running minimal current through the loop circuit. With the second transistor Q2 switched off, the output voltage $V_{output}$ rises equal to the voltage source $V_{source}$.

It should now be understood that under normal conditions the output voltage $V_{output}$ is held low while during an attack the output voltage $V_{output}$ goes high. Therefore, if the protected circuit 20 monitors the output voltage $V_{output}$, then the protected circuit 20 can determine when to initiate an appropriate response by watching for this change in output.

A particular arrangement for sizing the discrete components described above is setting the series resistors R1, R2 and R3 equal to 400 k ohms, the forth resistor R4 equal to 100 k ohms and insuring that the first and second loops do not exceed about 60 ohms each in their impedance. However, those skilled in the art will recognize that other arrangements may be better suited to different types of applications.

Based on the above description and the associated drawings, it should now be apparent that the present invention improves many aspects of obtaining reliable and cost-effective protection of integrated circuits. Those skilled in the art will recognize that various modifications and adaptations can be made without departing from the spirit of the present invention. For example, other detection circuits operative with the trigger circuit may be employed. In particular, to achieve more power conservation, a field effect transistor FET may be used in place of the first transistor Q1. However, as described in the most preferred embodiment, the present invention seeks a simple cost effective yet robust arrangement. Therefore, the inventive concept in its broader aspects is not limited to the specific details of the preferred embodiments described above, but is defined by the appended claims and their equivalents.

What is claimed is:

1. A tamper detection system for securing a protected integrated circuit from attack, the tamper detection system comprising:

a power source;

a trigger circuit including a plurality of resistors and a plurality of wire loops, the plurality of resistors including a first resistor, a second resistor and a third resistor, all of which being wired together in series and operatively connected to the power source, the plurality of wire loops including a first wire loop extending between the first resistor and the second resistor and a second wire loop extending between the second resistor and the third resistor, the first wire loop and the second wire loop being electrically isolated from each other but in physical proximity to each other so as to form a protective mesh that envelopes the protected integrated circuit;

a ground layer in physical proximity to the first wire loop or the second wire loop; and a detection circuit being in operative communication with the trigger circuit and the protected integrated circuit, the detection circuit including a first transistor and a second transistor, the first transistor being operatively connected across the second resistor so that the first transistor is controlled by a bias voltage across the second resistor, the second transistor being operatively connected across the first transistor and ground so that the second transistor is activated by an output current received from the first transistor, the detection circuit monitoring a flow of current through the trigger circuit, wherein if the flow of current through the trigger circuit is altered because of an open condition in the first wire loop or the second wire loop or a short between the first wire loop and the second wire loop or a short from the first wire loop or the second wire loop to the ground layer, then the detection circuit outputs a predetermined signal at a designated node located between the power source and the second transistor.

2. The tamper detection system of claim 1, wherein:

the detection circuit further includes a fourth resistor connected between the power source and the second transistor;

the first transistor is a PNP type having an emitter node, a base node and a collector node, the first transistor emitter node is connected between the first resistor and the second resistor, the first transistor base node is connected between the second resistor and the third resistor;

the second transistor is a NPN type having an emitter node, a base node and a collector node, the second transistor base node is connected to the first transistor collector node, the second transistor emitter node is connected to ground, the second transistor collector node is connected to the fourth resistor; and the designated node is between the fourth resistor and the second transistor collector node.

3. The tamper detection system of claim 2, wherein the predetermined signal is a high voltage condition substantially equal to the power source.

4. A tamper detection system for securing a protected integrated circuit from attack, the tamper detection system comprising:

a power source;

a trigger circuit including a plurality of resistors and a plurality of wire loops, the plurality of resistors including a first resistor, a second resistor and a third resistor, all of which being wired together in series and operatively connected to the power source, the plurality of wire loops including a first wire loop extending between the first resistor and the second resistor and a second wire loop extending between the second resistor and the third resistor, the first wire loop and the second wire loop being electrically isolated from each other but in physical proximity to each other so as to form a protective mesh that envelopes the protected integrated circuit; and a detection circuit being in operative communication with the trigger circuit and the protected integrated circuit, the detection circuit including a first transistor and a second transistor, the first transistor being operatively connected across the second resistor so that the first transistor is controlled by a bias voltage across the second resistor, the second transistor being operatively connected across the first transistor and ground so that the second transistor is activated by an output current received from the first transistor, the detection circuit monitoring a flow of current through the trigger circuit, wherein if the flow of current through the trigger circuit is altered because of an open condition in the first wire loop or the second wire loop or a short between the first wire loop and the second wire loon then the detection circuit outputs a predetermined signal at a designated node located between the power source and the second transistor.

5. The tamper detection system of claim 4, wherein:

the detection circuit further includes a fourth resistor connected between the power source and the second transistor;

the first transistor is a PNP type having an emitter node, a base node and a collector node, the first transistor emitter node is connected between the first resistor and the second resistor, the first transistor base node is connected between the second resistor and the third resistor;

the second transistor is a NPN type having an emitter node, a base node and a collector node, the second transistor base node is connected to the first transistor collector node, the second transistor emitter node is connected to ground, the second transistor collector node is connected to the fourth resistor; and the designated node is between the fourth resistor and the second transistor collector node.

6. The tamper detection system of claim 5, wherein; the predetermined signal is a high voltage condition substantially equal to the power source.

7. A method of producing a tamper detection system for securing a protected integrated circuit from attack, the method comprising:

providing a power source;

providing a trigger circuit including a plurality of resistors and a plurality of wire loops, the plurality of resistors including a first resistor, a second resistor and a third resistor, all of which being wired together in series and operatively connected to the power source, the plurality of wire loops including a first wire loop extending between the first resistor and the second resistor and a second wire loop extending between the second resistor and the third resistor;

keeping the first wire loop and the second wire loop electrically isolated from each other;

placing the first wire loop and the second wire loop in physical proximity to each other so as to form a protective mesh that envelopes the protected integrated circuit;

providing a ground layer in physical proximity to the first wire loop or the second wire loop;

providing a detection circuit in operative communication with the trigger circuit and the protected integrated circuit, the detection circuit including a first transistor and a second transistor, the first transistor being operatively connected across the second resistor so that the first transistor is controlled by a bias voltage across the second resistor, the second transistor being operatively connected across the first transistor and around so that the second transistor is activated by an output current received from the first transistor, the detection circuit monitoring a flow of current through the trigger circuit, wherein if the flow of current through the trigger circuit is altered because of an open condition in the first wire loop or the second wire loop or a short between the first wire loop and the second wire loop or a short between the first wire loop or second wire loop and the ground layer, then the detection circuit outputs a predetermined signal at a designated node located between the power source and the second transistor.

8. The method of claim 7, wherein:

the detection circuit further includes a fourth resistor connected between the power source and the second transistor;

the first transistor is a PNP type having an emitter node, a base node and a collector node, the first transistor emitter node is connected between the first resistor and the second resistor, the first transistor bias node is connected between the second resistor and the third resistor;

the second transistor is a NPN type having an emitter node, a base node and a collector node, the second transistor base node is connected to the first transistor collector node, the second transistor emitter node is connected to ground, the second transistor collector node is connected to the fourth resistor; and the designated node is between the fourth resistor and the second transistor collector node.

9. The method of claim 8, wherein the predetermined signal is a high voltage condition substantially equal to the power source.

10. A method of producing a tamper detection system for securing a protected integrated circuit from attack, the method comprising:

providing a power source;

providing a trigger circuit including a plurality of resistors and a plurality of wire loops, the plurality of resistors including a first resistor, a second resistor and a third resistor, all of which being wired together in series and operatively connected to the power source, the plurality of wire loops including a first wire loop extending between the first resistor and the second resistor and a second wire loop extending between the second resistor and the third resistor;

keeping the first wire loon and the second wire loop electrically isolated from each other;

placing the first wire loop and the second wire loop in physical proximity to each other so as to form a protective mesh that envelopes the protected integrated circuit;

providing a detection circuit in operative communication with the trigger circuit and the protected integrated circuit, the detection circuit including a first transistor and a second transistor, the first transistor being operatively connected across the second resistor so that the first transistor is controlled by a bias voltage across the second resistor, the second transistor being operatively connected across the first transistor and ground so that the second transistor is activated by an output current received from the first transistor, the detection circuit monitoring a flow of current through the trigger circuit, wherein if the flow of current through the trigger circuit is altered because of an open condition in the first wire loon or the second wire loop or a short between the first wire loop and the second wire loop then the detection circuit outputs a predetermined signal at a designated node located between the power source and the second transistor.

11. The method of claim 10, wherein:

the detection circuit further includes a fourth resistor connected between the power source and the second transistor;

the first transistor is a PNP type having an emitter node, a base node and a collector node, the first transistor emitter node is connected between the first resistor and the second resistor, the first transistor base node is connected between the second resistor and the third resistor;

the second transistor is a NPN type having an emitter node, a base node and a collector node, the second transistor base node is connected to the first transistor collector node, the second transistor emitter node is connected to ground, the second transistor collector node is connected to the fourth resistor; and the designated node is between the fourth resistor and the second transistor collector node.

12. The method of claim 11, wherein the predetermined signal is a high voltage condition substantially equal to the power source.

13. A method of detecting an attempt to tamper with a protected integrated circuit, the method comprising:

providing a power source;

providing a trigger circuit including a plurality of resistors and a plurality of wire loops, the plurality of resistors including a first resistor, a second resistor and a third resistor, all of which being wired together in series and operatively connected to the power source, the plurality of wire loops including a first wire loop extending between the first resistor and the second resistor and a second wire loop extending between the second resistor and the third resistor;

keeping the first wire loop and the second wire loop electrically isolated from each other;

placing the first wire loop and the second wire loop in physical proximity to each other so as to form a protective mesh that envelopes the protected integrated circuit;

providing a ground layer in physical proximity to the first wire loop or the second wire loop;

providing a detection circuit in operative communication with the trigger circuit and the protected integrated circuit, the detection circuit including a first transistor and a second transistor, the first transistor being operatively connected across the second resistor so that the first transistor is controlled by a bias voltage across the second resistor, the second transistor being operatively connected across the first transistor and ground so that the second transistor is activated by an output current received from the first transistor, the detection circuit monitoring a flow of current through the trigger circuit; and if the flow of current through the trigger circuit is altered because of an open condition in the first wire loop or the second wire loop or a short between the first wire loop and the second wire loop or a short between the first wire loop or the second wire loop and the around layer, then outputting a predetermined signal at a designated node of the detection circuit located between the power source and the second transistor.

14. The method of claim 13, wherein:

the detection circuit further includes a fourth resistor connected between the power source and the second transistor;

the first transistor is a PNP type having an emitter node, a base node and a collector node, the first transistor emitter node is connected between the first resistor and the second resistor, the first transistor base node is connected between the second resistor and the third resistor;

the second transistor is a NPN type having an emitter node, a base node and a collector node, the second transistor base node is connected to the first transistor collector node, the second transistor emitter node is connected to ground, the second transistor collector node is connected to the fourth resistor; and the designated node is between the fourth resistor and the second transistor collector node.

15. The method of claim 14, wherein the predetermined signal is a high voltage condition substantially equal to the power source.

16. A method of detecting an attempt to tamper with a protected integrated circuit, the method comprising:

providing a power source;

providing a trigger circuit including a plurality of resistors and a plurality of wire loops, the plurality of resistors including a first resistor, a second resistor and a third resistor, all of which being wired together in series and operatively connected to the power source, the plurality of wire loops including a first wire loop extending between the first resistor and the second resistor and a second wire loop extending between the second resistor and the third resistor;

keeping the first wire loop and the second wire loop electrically isolated from each other;

placing the first wire loop and the second wire loop in physical proximity to each other so as to form a protective mesh that envelopes the protected integrated circuit;

providing a detection circuit in operative communication with the trigger circuit and the protected integrated circuit, the detection circuit including a first transistor and a second transistor, the first transistor being operatively connected across the second resistor so that the first transistor is controlled by a bias voltage across the second resistor, the second transistor being operatively connected across the first transistor and ground so that the second transistor is activated by an output current received from the first transistor, the detection circuit monitoring a flow of current through the trigger circuit; and if the flow of current through the trigger circuit is altered because of an open condition in the first wire loop or the second wire loop or a short between the first wire loop and the second wire loop, then outputting a predetermined signal at a designated node located between the power source and the second transistor.

17. The method of claim 16, wherein:

the detection circuit further includes a fourth resistor connected between the power source and the second transistor;

the first transistor is a PNP type having an emitter node, a base node and a collector node, the first transistor emitter node is connected between the first resistor and the second resistor, the first transistor base node is connected between the second resistor and the third resistor;

the second transistor is a NPN type having an emitter node, a base node and a collector node, the second transistor base node is connected to the first transistor collector node, the second transistor emitter node is connected to ground, the second transistor collector node is connected to the fourth resistor; and the designated node is between the fourth resistor and the second transistor collector node.

18. The method of claim 17, wherein the predetermined signal is a high voltage condition substantially equal to the power source.

19. An integrated circuit assembly comprising:

an integrated circuit;

a protective barrier enveloping the integrated circuit, the protective barrier including a first wire loop and a second wire loop electrically isolated from each other, a first end of the first wire loop being coupled to a first end of a first resistor, a second end of the first wire loop being coupled to a first end of a second resistor, a first end of the second wire loop being coupled to a second end of the second resistor, and a second end of the second wire loop being coupled to a first end of a third resistor;

a power source coupled to a first end of the first resistor;

a detection circuit including a first transistor having a first, second and third node, the first node being coupled to the first end of the second resistor, the second node being coupled to the second end of the second resistor, the detection circuit further including a second transistor having a first, second and third node, the first node of the second transistor being coupled to ground, the second node of the second transistor being coupled to the third node of the first transistor, and the third node of the second transistor being coupled to the power source and to an output of the detection circuit, the output of the detection circuit being input to the integrated circuit, wherein the detection circuit monitors a flow of current through the first and second wire loops, and if the flow of current through the first and second wire loops is altered, the output of the detection circuit changes from a first signal to a second signal.

20. The intergrated circuit assembly of claim 19, wherein the protective barrier further comprises:

a ground layer in physical proximity to the first wire loop or the second wire loop, wherein a short between the first wire loop or second wire loop and the ground layer will cause the flow of current through the first and second wire loops to be altered.

* * * * *